(12) United States Patent
Sanford et al.

(10) Patent No.: US 11,069,986 B2
(45) Date of Patent: Jul. 20, 2021

(54) OMNI-DIRECTIONAL ORTHOGONALLY-POLARIZED ANTENNA SYSTEM FOR MIMO APPLICATIONS

(71) Applicant: AIRSPAN IP HOLDCO LLC, Boca Raton, FL (US)

(72) Inventors: John Sanford, Elfin Forest, CA (US); Brian Hinman, Los Gatos, CA (US); Justin Lee, Santa Clara, CA (US); Carlos Ramos, San Jose, CA (US); Syed Aon Mujtaba, Santa Clara, CA (US)

(73) Assignee: AIRSPAN IP HOLDCO LLC, Boca Raton, FL (US)

( * ) Notice: Subject to any disclaimer, the term of this patent is extended or adjusted under 35 U.S.C. 154(b) by 45 days.

(21) Appl. No.: 16/284,121

(22) Filed: Feb. 25, 2019

(65) Prior Publication Data
US 2019/0273326 A1 Sep. 5, 2019

Related U.S. Application Data

(60) Provisional application No. 62/637,971, filed on Mar. 2, 2018.

(51) Int. Cl.
*H01Q 21/20* (2006.01)
*H01Q 21/26* (2006.01)
(Continued)

(52) U.S. Cl.
CPC ......... *H01Q 21/205* (2013.01); *H01Q 9/0428* (2013.01); *H01Q 21/26* (2013.01); *H04B 7/0413* (2013.01); *H04B 7/10* (2013.01)

(58) Field of Classification Search
CPC ............ H01Q 3/40; H01Q 1/246; H01Q 5/30; H01Q 15/242; H01Q 3/26; H01Q 13/24;
(Continued)

(56) References Cited

U.S. PATENT DOCUMENTS

| 2,115,761 A | 5/1938 | Dower |
| 2,735,993 A | 2/1956 | Humphrey |

(Continued)

FOREIGN PATENT DOCUMENTS

| CN | 104335654 A | 2/2015 |
| CN | 303453662 S | 11/2015 |

(Continued)

OTHER PUBLICATIONS

"Partial Supplemental European Search Report," European Patent Application No. 17835073.2, dated Feb. 13, 2020, 17 pages.
(Continued)

*Primary Examiner* — Monica C King
(74) *Attorney, Agent, or Firm* — Carr & Ferrell LLP

(57) ABSTRACT

Omni-directional orthogonally-polarized antenna system for MIMO applications are disclosed herein. An example antenna system can have two arrays of horizontally polarized radiating elements, and two arrays of vertically polarized radiating elements, each array having roughly 180-degree radiation pattern, disposed about a central axis in a common horizontal plane, arrays of common polarization separated by 180-degrees, such that MIMO processing of signals to the arrays of common polarization results in a radiation pattern that is substantially constant over 360-degrees in azimuth.

19 Claims, 7 Drawing Sheets

(51) Int. Cl.
  *H01Q 9/04* (2006.01)
  *H04B 7/0413* (2017.01)
  *H04B 7/10* (2017.01)

(58) Field of Classification Search
  CPC ...... H01Q 19/08; H01Q 25/00; H01Q 19/132; H01Q 21/064; H01Q 21/205; H01Q 21/067; H01Q 3/08; H01Q 1/42; H01Q 21/24; H01Q 21/26; H01Q 21/28; H01Q 9/0428
  See application file for complete search history.

(56) References Cited

U.S. PATENT DOCUMENTS

| | | | |
|---|---|---|---|
| 3,182,129 A | 5/1965 | Clark et al. |
| D227,476 S | 6/1973 | Kennedy |
| 4,188,633 A | 2/1980 | Frazita |
| 4,402,566 A | 9/1983 | Powell et al. |
| D273,111 S | 3/1984 | Hirata et al. |
| 4,543,579 A | 9/1985 | Teshirogi |
| 4,562,416 A | 12/1985 | Sedivec |
| 4,626,863 A | 12/1986 | Knop et al. |
| 4,835,538 A | 5/1989 | McKenna et al. |
| 4,866,451 A | 9/1989 | Chen |
| 4,893,288 A | 1/1990 | Maier et al. |
| 4,903,033 A | 2/1990 | Tsao et al. |
| 4,986,764 A | 1/1991 | Eaby et al. |
| 5,015,195 A | 5/1991 | Piriz |
| 5,087,920 A | 2/1992 | Tsurumaru et al. |
| 5,226,837 A | 7/1993 | Cinibulk et al. |
| 5,231,406 A | 7/1993 | Sreenivas |
| 5,285,211 A | 2/1994 | Herper et al. |
| D346,598 S | 5/1994 | McCay et al. |
| D355,416 S | 2/1995 | McCay et al. |
| 5,389,941 A | 2/1995 | Yu |
| 5,491,833 A | 2/1996 | Hamabe |
| 5,513,380 A | 4/1996 | Ivanov et al. |
| 5,539,361 A | 7/1996 | Davidovitz |
| 5,561,434 A | 10/1996 | Yamazaki |
| D375,501 S | 11/1996 | Lee et al. |
| 5,580,264 A | 12/1996 | Aoyama et al. |
| 5,600,338 A | 2/1997 | Ecklund et al. |
| 5,684,495 A | 11/1997 | Dyott et al. |
| D389,575 S | 1/1998 | Grasfield et al. |
| 5,724,666 A | 3/1998 | Dent |
| 5,742,911 A | 4/1998 | Dumbrill et al. |
| 5,746,611 A | 5/1998 | Brown et al. |
| 5,764,696 A | 6/1998 | Barnes et al. |
| 5,797,083 A | 8/1998 | Anderson |
| 5,831,582 A | 11/1998 | Muhlhauser et al. |
| 5,966,102 A | 10/1999 | Runyon |
| 5,995,063 A | 11/1999 | Somoza et al. |
| 6,014,372 A | 1/2000 | Kent et al. |
| 6,057,804 A | 5/2000 | Kaegebein |
| 6,067,053 A | 5/2000 | Runyon et al. |
| 6,137,449 A | 10/2000 | Kildal |
| 6,140,962 A | 10/2000 | Groenenboom |
| 6,176,739 B1 | 1/2001 | Denlinger et al. |
| 6,216,266 B1 | 4/2001 | Eastman et al. |
| 6,271,802 B1 | 8/2001 | Clark et al. |
| 6,304,762 B1 | 10/2001 | Myers et al. |
| D455,735 S | 4/2002 | Winslow |
| 6,421,538 B1 | 7/2002 | Byrne |
| 6,716,063 B1 | 4/2004 | Bryant et al. |
| 6,754,511 B1 | 6/2004 | Halford et al. |
| 6,847,653 B1 | 1/2005 | Smiroldo |
| D501,848 S | 2/2005 | Uehara et al. |
| 6,853,336 B2 | 2/2005 | Asano et al. |
| 6,864,837 B2 | 3/2005 | Runyon et al. |
| 6,877,277 B2 | 4/2005 | Kussel et al. |
| 6,962,445 B2 | 11/2005 | Zimmel et al. |
| 7,075,492 B1 | 7/2006 | Chen et al. |
| D533,899 S | 12/2006 | Ohashi et al. |
| 7,173,570 B1 | 2/2007 | Wensink et al. |
| 7,187,328 B2 | 3/2007 | Tanaka et al. |
| 7,193,562 B2 | 3/2007 | Shtrom et al. |
| 7,212,162 B2 | 5/2007 | Jung et al. |
| 7,212,163 B2 | 5/2007 | Huang et al. |
| 7,245,265 B2 | 7/2007 | Kienzle et al. |
| 7,253,783 B2 | 8/2007 | Chiang et al. |
| 7,264,494 B2 | 9/2007 | Kennedy et al. |
| 7,281,856 B2 | 10/2007 | Grzegorzewska et al. |
| 7,292,198 B2 | 11/2007 | Shtrom et al. |
| 7,306,485 B2 | 12/2007 | Masuzaki |
| 7,316,583 B1 | 1/2008 | Mistarz |
| 7,324,057 B2 | 1/2008 | Argaman et al. |
| D566,698 S | 4/2008 | Choi et al. |
| 7,362,236 B2 | 4/2008 | Hoiness |
| 7,369,095 B2 | 5/2008 | Hirtzlin et al. |
| 7,380,984 B2 | 6/2008 | Wuester |
| 7,431,602 B2 | 10/2008 | Corona |
| 7,498,896 B2 | 3/2009 | Shi |
| 7,498,996 B2 | 3/2009 | Shtrom et al. |
| 7,507,105 B1 | 3/2009 | Peters et al. |
| 7,522,095 B1 | 4/2009 | Wasiewicz et al. |
| 7,542,717 B2 | 6/2009 | Green, Sr. et al. |
| 7,581,976 B2 | 9/2009 | Liepold et al. |
| 7,586,891 B1 | 9/2009 | Masciulli |
| 7,616,959 B2 | 11/2009 | Spenik et al. |
| 7,646,343 B2 | 1/2010 | Shtrom et al. |
| 7,675,473 B2 | 3/2010 | Kienzle et al. |
| 7,675,474 B2 | 3/2010 | Shtrom et al. |
| 7,726,997 B2 | 6/2010 | Kennedy et al. |
| 7,778,226 B2 | 8/2010 | Rayzman et al. |
| 7,857,523 B2 | 12/2010 | Masuzaki |
| 7,929,914 B2 | 4/2011 | Tegreene |
| RE42,522 E | 7/2011 | Zimmel et al. |
| 8,009,646 B2 | 8/2011 | Lastinger et al. |
| 8,069,465 B1 | 11/2011 | Bartholomay et al. |
| 8,111,678 B2 | 2/2012 | Lastinger et al. |
| 8,254,844 B2 | 8/2012 | Kuffner et al. |
| 8,270,383 B2 | 9/2012 | Lastinger et al. |
| 8,275,265 B2 | 9/2012 | Kobyakov et al. |
| 8,325,695 B2 | 12/2012 | Lastinger et al. |
| D674,787 S | 1/2013 | Tsuda et al. |
| 8,345,651 B2 | 1/2013 | Lastinger et al. |
| 8,385,305 B1 | 2/2013 | Negus et al. |
| 8,425,260 B2 | 4/2013 | Seefried et al. |
| 8,482,478 B2 | 7/2013 | Hartenstein |
| 8,515,434 B1 | 8/2013 | Narendran et al. |
| 8,515,495 B2 | 8/2013 | Shang et al. |
| D694,740 S | 12/2013 | Apostolakis |
| 8,777,660 B2 | 7/2014 | Chiarelli et al. |
| 8,792,759 B2 | 7/2014 | Benton et al. |
| 8,827,729 B2 | 9/2014 | Gunreben et al. |
| 8,836,601 B2 | 9/2014 | Sanford et al. |
| 8,848,389 B2 | 9/2014 | Kawamura et al. |
| 8,870,069 B2 | 10/2014 | Bellows |
| 8,935,122 B2 | 1/2015 | Stisser |
| 9,001,689 B1 | 4/2015 | Hinman et al. |
| 9,019,874 B2 | 4/2015 | Choudhury et al. |
| 9,077,071 B2 | 7/2015 | Shtrom et al. |
| 9,107,134 B1 | 8/2015 | Belser et al. |
| 9,130,305 B2 | 9/2015 | Ramos et al. |
| 9,161,387 B2 | 10/2015 | Fink et al. |
| 9,179,336 B2 | 11/2015 | Fink et al. |
| 9,191,081 B2 | 11/2015 | Hinman et al. |
| D752,566 S | 3/2016 | Hinman et al. |
| 9,295,103 B2 | 3/2016 | Fink et al. |
| 9,362,629 B2 | 6/2016 | Hinman et al. |
| 9,391,375 B1 | 7/2016 | Bales et al. |
| 9,407,012 B2 | 8/2016 | Shtrom et al. |
| 9,431,702 B2 | 8/2016 | Hartenstein |
| 9,504,049 B2 | 11/2016 | Hinman et al. |
| 9,531,114 B2 | 12/2016 | Ramos et al. |
| 9,537,204 B2 | 1/2017 | Cheng et al. |
| 9,577,340 B2 | 2/2017 | Fakharzadeh et al. |
| 9,693,388 B2 | 6/2017 | Fink et al. |
| 9,780,892 B2 | 10/2017 | Hinman et al. |
| 9,843,940 B2 | 12/2017 | Hinman et al. |
| 9,871,302 B2 | 1/2018 | Hinman et al. |
| 9,888,485 B2 | 2/2018 | Hinman et al. |
| 9,930,592 B2 | 3/2018 | Hinman |
| 9,949,147 B2 | 4/2018 | Hinman et al. |

(56) References Cited

U.S. PATENT DOCUMENTS

| | | |
|---|---|---|
| 9,986,565 B2 | 5/2018 | Fink et al. |
| 9,998,246 B2 | 6/2018 | Hinman et al. |
| 10,028,154 B2 | 7/2018 | Elson |
| 10,090,943 B2 | 10/2018 | Hinman et al. |
| 10,096,933 B2 | 10/2018 | Ramos et al. |
| 10,117,114 B2 | 10/2018 | Hinman et al. |
| 10,186,786 B2 | 1/2019 | Hinman et al. |
| 10,200,925 B2 | 2/2019 | Hinman |
| 10,257,722 B2 | 4/2019 | Hinman et al. |
| 10,425,944 B2 | 9/2019 | Fink et al. |
| 10,447,417 B2 | 10/2019 | Hinman et al. |
| 10,511,074 B2 | 12/2019 | Eberhardt et al. |
| 10,595,253 B2 | 3/2020 | Hinman |
| 10,616,903 B2 | 4/2020 | Hinman et al. |
| 10,938,110 B2 | 3/2021 | Hinman et al. |
| 10,958,332 B2 | 3/2021 | Hinman et al. |
| 2001/0033600 A1 | 10/2001 | Yang et al. |
| 2002/0102948 A1 | 8/2002 | Stanwood et al. |
| 2002/0159434 A1 | 10/2002 | Gosior et al. |
| 2003/0013452 A1 | 1/2003 | Hunt et al. |
| 2003/0027577 A1 | 2/2003 | Brown et al. |
| 2003/0169763 A1 | 9/2003 | Choi |
| 2003/0222831 A1 | 12/2003 | Dunlap |
| 2003/0224741 A1 | 12/2003 | Sugar et al. |
| 2004/0002357 A1 | 1/2004 | Benveniste |
| 2004/0029549 A1 | 2/2004 | Fikart |
| 2004/0110469 A1 | 6/2004 | Judd et al. |
| 2004/0120277 A1 | 6/2004 | Holur et al. |
| 2004/0155819 A1 | 8/2004 | Martin et al. |
| 2004/0196812 A1 | 10/2004 | Barber |
| 2004/0196813 A1 | 10/2004 | Ofek et al. |
| 2004/0240376 A1 | 12/2004 | Wang et al. |
| 2004/0242274 A1 | 12/2004 | Corbett et al. |
| 2005/0012665 A1 | 1/2005 | Runyon et al. |
| 2005/0032479 A1 | 2/2005 | Miller et al. |
| 2005/0058111 A1 | 3/2005 | Hung et al. |
| 2005/0124294 A1 | 6/2005 | Wentink |
| 2005/0143014 A1 | 6/2005 | Li et al. |
| 2005/0195758 A1 | 9/2005 | Chitrapu |
| 2005/0227625 A1 | 10/2005 | Diener |
| 2005/0254442 A1 | 11/2005 | Proctor, Jr. et al. |
| 2005/0271056 A1 | 12/2005 | Kaneko |
| 2005/0275527 A1 | 12/2005 | Kates |
| 2006/0025072 A1 | 2/2006 | Pan |
| 2006/0072518 A1 | 4/2006 | Pan et al. |
| 2006/0098592 A1 | 5/2006 | Proctor, Jr. et al. |
| 2006/0099940 A1 | 5/2006 | Pfleging et al. |
| 2006/0132359 A1 | 6/2006 | Chang et al. |
| 2006/0132602 A1 | 6/2006 | Muto et al. |
| 2006/0172578 A1 | 8/2006 | Parsons |
| 2006/0187952 A1 | 8/2006 | Kappes et al. |
| 2006/0211430 A1 | 9/2006 | Persico |
| 2006/0276073 A1 | 12/2006 | McMurray et al. |
| 2007/0001910 A1 | 1/2007 | Yamanaka et al. |
| 2007/0019664 A1 | 1/2007 | Benveniste |
| 2007/0035463 A1 | 2/2007 | Hirabayashi |
| 2007/0060158 A1 | 3/2007 | Medepalli et al. |
| 2007/0132643 A1 | 6/2007 | Durham et al. |
| 2007/0173199 A1 | 7/2007 | Sinha |
| 2007/0173260 A1 | 7/2007 | Love et al. |
| 2007/0202809 A1 | 8/2007 | Lastinger et al. |
| 2007/0210974 A1 | 9/2007 | Chiang |
| 2007/0223701 A1 | 9/2007 | Emeott et al. |
| 2007/0238482 A1 | 10/2007 | Rayzman et al. |
| 2007/0255797 A1 | 11/2007 | Dunn et al. |
| 2007/0268848 A1 | 11/2007 | Khandekar et al. |
| 2008/0109051 A1 | 5/2008 | Splinter et al. |
| 2008/0112380 A1 | 5/2008 | Fischer |
| 2008/0192707 A1 | 8/2008 | Xhafa et al. |
| 2008/0218418 A1 | 9/2008 | Gillette |
| 2008/0231541 A1 | 9/2008 | Teshirogi et al. |
| 2008/0242342 A1 | 10/2008 | Rofougaran |
| 2009/0046673 A1 | 2/2009 | Kaidar |
| 2009/0051597 A1 | 2/2009 | Wen et al. |
| 2009/0052362 A1 | 2/2009 | Meier et al. |
| 2009/0059794 A1 | 3/2009 | Frei |
| 2009/0075606 A1 | 3/2009 | Shtrom et al. |
| 2009/0096699 A1 | 4/2009 | Chiu et al. |
| 2009/0232026 A1 | 9/2009 | Lu |
| 2009/0233475 A1 | 9/2009 | Mildon et al. |
| 2009/0291690 A1 | 11/2009 | Guvenc et al. |
| 2009/0315792 A1 | 12/2009 | Miyashita et al. |
| 2010/0029282 A1 | 2/2010 | Stamoulis et al. |
| 2010/0034191 A1 | 2/2010 | Schulz |
| 2010/0039340 A1 | 2/2010 | Brown |
| 2010/0046650 A1 | 2/2010 | Jongren et al. |
| 2010/0067505 A1 | 3/2010 | Fein et al. |
| 2010/0085950 A1 | 4/2010 | Sekiya |
| 2010/0091818 A1 | 4/2010 | Sen et al. |
| 2010/0103065 A1 | 4/2010 | Shtrom et al. |
| 2010/0103066 A1 | 4/2010 | Shtrom et al. |
| 2010/0136978 A1 | 6/2010 | Cho et al. |
| 2010/0151877 A1 | 6/2010 | Lee et al. |
| 2010/0167719 A1 | 7/2010 | Sun |
| 2010/0171665 A1 | 7/2010 | Nogami |
| 2010/0171675 A1 | 7/2010 | Borja et al. |
| 2010/0189005 A1 | 7/2010 | Bertani et al. |
| 2010/0202613 A1 | 8/2010 | Ray et al. |
| 2010/0210147 A1 | 8/2010 | Hauser |
| 2010/0216412 A1 | 8/2010 | Rofougaran |
| 2010/0225529 A1 | 9/2010 | Landreth et al. |
| 2010/0238083 A1 | 9/2010 | Malasani |
| 2010/0304680 A1 | 12/2010 | Kuffner et al. |
| 2010/0311321 A1 | 12/2010 | Norin |
| 2010/0315307 A1 | 12/2010 | Syed et al. |
| 2010/0322219 A1 | 12/2010 | Fischer et al. |
| 2011/0006956 A1 | 1/2011 | McCown |
| 2011/0028097 A1 | 2/2011 | Memik et al. |
| 2011/0032159 A1 | 2/2011 | Wu et al. |
| 2011/0044186 A1 | 2/2011 | Jung et al. |
| 2011/0090129 A1 | 4/2011 | Weily et al. |
| 2011/0103309 A1 | 5/2011 | Wang et al. |
| 2011/0111715 A1 | 5/2011 | Buer et al. |
| 2011/0112717 A1 | 5/2011 | Resner |
| 2011/0133996 A1 | 6/2011 | Alapuranen |
| 2011/0170424 A1 | 7/2011 | Safavi |
| 2011/0172916 A1 | 7/2011 | Pakzad et al. |
| 2011/0182260 A1 | 7/2011 | Sivakumar et al. |
| 2011/0182277 A1 | 7/2011 | Shapira |
| 2011/0194644 A1 | 8/2011 | Liu et al. |
| 2011/0206012 A1 | 8/2011 | Youn et al. |
| 2011/0241969 A1 | 10/2011 | Zhang et al. |
| 2011/0243291 A1 | 10/2011 | McAllister et al. |
| 2011/0256874 A1 | 10/2011 | Hayama et al. |
| 2011/0291914 A1 | 12/2011 | Lewry et al. |
| 2012/0008542 A1 | 1/2012 | Koleszar et al. |
| 2012/0040700 A1 | 2/2012 | Gomes et al. |
| 2012/0057533 A1 | 3/2012 | Junell et al. |
| 2012/0093091 A1 | 4/2012 | Kang et al. |
| 2012/0115487 A1 | 5/2012 | Josso |
| 2012/0134280 A1 | 5/2012 | Rotvold et al. |
| 2012/0140651 A1 | 6/2012 | Nicoara et al. |
| 2012/0200449 A1 | 8/2012 | Bielas |
| 2012/0238201 A1 | 9/2012 | Du et al. |
| 2012/0263145 A1 | 10/2012 | Marinier et al. |
| 2012/0282868 A1 | 11/2012 | Hahn |
| 2012/0299789 A1 | 11/2012 | Orban et al. |
| 2012/0314634 A1 | 12/2012 | Sekhar |
| 2013/0003645 A1 | 1/2013 | Shapira et al. |
| 2013/0005350 A1 | 1/2013 | Campos et al. |
| 2013/0023216 A1 | 1/2013 | Moscibroda et al. |
| 2013/0044028 A1 | 2/2013 | Lea et al. |
| 2013/0064161 A1 | 3/2013 | Hedayat et al. |
| 2013/0082899 A1 | 4/2013 | Gomi |
| 2013/0095747 A1 | 4/2013 | Moshfeghi |
| 2013/0128858 A1 | 5/2013 | Zou et al. |
| 2013/0176902 A1 | 7/2013 | Wentink et al. |
| 2013/0182652 A1 | 7/2013 | Tong et al. |
| 2013/0195081 A1 | 8/2013 | Merlin et al. |
| 2013/0210457 A1 | 8/2013 | Kummetz |
| 2013/0223398 A1 | 8/2013 | Li et al. |
| 2013/0234898 A1 | 9/2013 | Leung et al. |
| 2013/0271319 A1 | 10/2013 | Trerise |
| 2013/0286950 A1 | 10/2013 | Pu |

(56) References Cited

U.S. PATENT DOCUMENTS

| | | |
|---|---|---|
| 2013/0286959 A1 | 10/2013 | Lou et al. |
| 2013/0288735 A1 | 10/2013 | Guo |
| 2013/0301438 A1 | 11/2013 | Li et al. |
| 2013/0322276 A1 | 12/2013 | Pelletier et al. |
| 2013/0322413 A1 | 12/2013 | Pelletier et al. |
| 2014/0024328 A1 | 1/2014 | Balbien et al. |
| 2014/0051357 A1 | 2/2014 | Steer et al. |
| 2014/0098748 A1 | 4/2014 | Chan et al. |
| 2014/0113676 A1 | 4/2014 | Hamalainen et al. |
| 2014/0145890 A1 | 5/2014 | Ramberg et al. |
| 2014/0154895 A1 | 6/2014 | Poulsen et al. |
| 2014/0185494 A1 | 7/2014 | Yang et al. |
| 2014/0191918 A1 | 7/2014 | Cheng et al. |
| 2014/0198867 A1 | 7/2014 | Sturkovich et al. |
| 2014/0206322 A1 | 7/2014 | Dimou et al. |
| 2014/0225788 A1 | 8/2014 | Schulz et al. |
| 2014/0233613 A1 | 8/2014 | Fink et al. |
| 2014/0235244 A1 | 8/2014 | Hinman |
| 2014/0253378 A1 | 9/2014 | Hinman |
| 2014/0253402 A1 | 9/2014 | Hinman et al. |
| 2014/0254700 A1 | 9/2014 | Hinman et al. |
| 2014/0256166 A1 | 9/2014 | Ramos et al. |
| 2014/0320306 A1 | 10/2014 | Winter |
| 2014/0320377 A1 | 10/2014 | Cheng et al. |
| 2014/0328238 A1 | 11/2014 | Seok et al. |
| 2014/0341013 A1 | 11/2014 | Kumar |
| 2014/0355578 A1 | 12/2014 | Fink et al. |
| 2014/0355584 A1 | 12/2014 | Fink et al. |
| 2015/0002335 A1 | 1/2015 | Hinman et al. |
| 2015/0002354 A1 | 1/2015 | Knowles |
| 2015/0015435 A1 | 1/2015 | Shen et al. |
| 2015/0116177 A1 | 4/2015 | Powell et al. |
| 2015/0156642 A1 | 6/2015 | Sobczak et al. |
| 2015/0215952 A1 | 7/2015 | Hinman et al. |
| 2015/0256275 A1 | 9/2015 | Hinman et al. |
| 2015/0263816 A1 | 9/2015 | Hinman et al. |
| 2015/0319584 A1 | 11/2015 | Fink et al. |
| 2015/0321017 A1 | 11/2015 | Perryman et al. |
| 2015/0325945 A1 | 11/2015 | Ramos et al. |
| 2015/0327272 A1 | 11/2015 | Fink et al. |
| 2015/0365866 A1 | 12/2015 | Hinman et al. |
| 2016/0119018 A1 | 4/2016 | Lindgren et al. |
| 2016/0149634 A1 | 5/2016 | Kalkunte et al. |
| 2016/0149635 A1 | 5/2016 | Hinman et al. |
| 2016/0211583 A1 | 7/2016 | Lee et al. |
| 2016/0240929 A1 | 8/2016 | Hinman et al. |
| 2016/0338076 A1 | 11/2016 | Hinman et al. |
| 2016/0365666 A1 | 12/2016 | Ramos et al. |
| 2016/0366601 A1 | 12/2016 | Hinman et al. |
| 2017/0048647 A1 | 2/2017 | Jung et al. |
| 2017/0201028 A1 | 7/2017 | Eberhardt et al. |
| 2017/0238151 A1 | 8/2017 | Fink et al. |
| 2017/0294975 A1 | 10/2017 | Hinman et al. |
| 2018/0034166 A1 | 2/2018 | Hinman |
| 2018/0035317 A1 | 2/2018 | Hinman et al. |
| 2018/0083365 A1 | 3/2018 | Hinman et al. |
| 2018/0084563 A1 | 3/2018 | Hinman et al. |
| 2018/0160353 A1 | 6/2018 | Hinman |
| 2018/0167105 A1* | 6/2018 | Vannucci ................ H04B 3/52 |
| 2018/0192305 A1 | 7/2018 | Hinman et al. |
| 2018/0199345 A1 | 7/2018 | Fink et al. |
| 2018/0241491 A1 | 8/2018 | Hinman et al. |
| 2019/0006789 A1 | 1/2019 | Ramos et al. |
| 2019/0182686 A1* | 6/2019 | Hinman ................ H04W 24/02 |
| 2019/0214699 A1 | 7/2019 | Eberhardt et al. |
| 2019/0215745 A1 | 7/2019 | Hinman |
| 2020/0015231 A1 | 1/2020 | Fink et al. |
| 2020/0036465 A1 | 1/2020 | Hinman et al. |
| 2020/0067164 A1 | 2/2020 | Eberhardt et al. |
| 2020/0083614 A1 | 3/2020 | Sanford et al. |

FOREIGN PATENT DOCUMENTS

| | | |
|---|---|---|
| CN | 105191204 A | 12/2015 |
| CN | 105191204 B | 5/2019 |
| EM | 002640177 | 2/2015 |
| EP | 1384285 B1 | 6/2007 |
| EP | 3491697 A1 | 6/2019 |
| WO | WO2014137370 A1 | 9/2014 |
| WO | WO2014138292 A1 | 9/2014 |
| WO | WO2014193394 A1 | 12/2014 |
| WO | WO2015112627 A1 | 7/2015 |
| WO | WO2017123558 A1 | 7/2017 |
| WO | WO2018022526 A1 | 2/2018 |
| WO | WO2019136257 A1 | 7/2019 |
| WO | WO2019168800 A1 | 9/2019 |

OTHER PUBLICATIONS

"Wireless Access Point," Wikipedia.org, Jan. 6, 2020 [retrieved on Feb. 3, 2020], Retrieved from the Internet: <https://en.wikipedia.org/wiki/Wireless_access_point>, 5 pages.

"Extended European Search Report", European Patent Application No. 17835073.2, dated Jun. 30, 2020, 15 pages.

Haupt, R.T., "Antenna Arrays: A Computational Approach", Chapter 5: Non-Planar Arrays; Wiley-IEEE Press (2010), pp. 287-338.

"International Search Report" and "Written Opinion of the International Search Authority," dated Nov. 26, 2013 in Patent Cooperation Treaty Application No. PCT/US2013/047406, filed Jun. 24, 2013, 9 pages.

"International Search Report" and "Written Opinion of the International Search Authority," dated Aug. 9, 2013 in Patent Cooperation Treaty Application No. PCT/US2013/043436, filed May 30, 2013, 13 pages.

"International Search Report" and "Written Opinion of the International Search Authority," dated Jul. 1, 2014 in Patent Cooperation Treaty Application No. PCT/US2014/020880, filed Mar. 5, 2014, 14 pages.

"International Search Report" and "Written Opinion of the International Search Authority," dated Jun. 29, 2015 in Patent Cooperation Treaty Application No. PCT/US2015/012285, filed Jan. 21, 2015, 15 pages.

Hinman et al., U.S. Appl. No. 61/774,632, filed Mar. 7, 2013, 23 pages.

Office Action dated Jun. 15, 2015 in Chinese Design Patent Application 201530058063.8, filed Mar. 11, 2015, 1 page.

Notice of Allowance dated Sep. 8, 2015 in Chinese Design Patent Application 201530058063.8, filed Mar. 11, 2015, 3 pages.

Weisstein, Eric, "Electric Polarization", Wolfram Reasearch [online], Retrieved from the Internet [retrieved Mar. 23, 2017] <URL:http://scienceworld.wolfram.com/physics/ElectricPolarization.html>, 2007, 1 page.

Liu, Lingjia et al., "Downlink MIMO in LTE-Advanced: SU-MIMO vs. MU-MIMO," IEEE Communications Magazine, Feb. 2012, pp. 140-147.

"International Search Report" and "Written Opinion of the International Searching Authority," Patent Cooperation Treaty Application No. PCT/US2017/012884, dated Apr. 6, 2017, 9 pages.

"Office Action," Chinese Patent Application No. 201580000078.6, dated Nov. 3, 2017, 5 pages [10 pages including translation].

"International Search Report" and "Written Opinion of the International Searching Authority," Patent Cooperation Treaty Application No. PCT/US2017/043560, dated Nov. 16, 2017, 11 pages.

"Office Action," Chinese Patent Application No. 201580000078.6, dated Jul. 30, 2018, 5 pages [11 pages including translation].

"Office Action," Chinese Patent Application No. 201580000078.6, dated Oct. 31, 2018, 3 pages [6 pages including translation].

"Notice of Allowance," Chinese Patent Application No. 201580000078.6, dated Feb. 11, 2019, 2 pages.

"International Search Report" and "Written Opinion of the International Search Authority," dated Mar. 22, 2019 in Patent Cooperation Treaty Application No. PCT/US2019/012358, filed Jan. 4, 2019, 9 pages.

FCC Regulations, 47 CFR § 15.407, 63 FR 40836, Jul. 31, 1998, as amended at 69 FR 2687, Jan. 20, 2004; 69 FR 54036, Sep. 7, 2004; pp. 843-846.

(56) References Cited

OTHER PUBLICATIONS

"International Search Report" and "Written Opinion of the International Search Authority," dated May 23, 2019 in Patent Cooperation Treaty Application No. PCT/US2019/019462, filed Feb. 25, 2019, 8 pages.

Illustration of Ubiquiti Networks airMax® Antenna; from Sanford, John et al., "Omni-Directional Orthogonally-Polarized Antenna System for MIMO Applications," U.S. Appl. No. 62/637,971, filed Mar. 2, 2018, Drawings, 1 page.

Illustration of Cisco Aironet 1552S Outdoor Wi-Fi Access Point; from Sanford, John et al., "Omni-Directional Orthogonally-Polarized Antenna System for MIMO Applications," U.S. Appl. No. 62/637,971, filed Mar. 2, 2018, Drawings, 1 page.

Teshirogi, Tasuku et al., "Wideband Circularly Polarized Array Antenna with Sequential Rotations and Phase Shift of Elements," Proceedings of the International Symposium on Antennas and Propagation, 1985, pp. 117-120.

"Sector Antennas," Radiowaves.com, [online], [retrieved Oct. 10, 2019], Retrieved from the Internet: <URL:https://www.radiowaves.com/en/products/sector-antennas>, 4 pages.

KP Performance Antennas Search Results for Antennas, Sector, Single, [online], KPPerformance.com [retrieved Oct. 10, 2019], Retrieved from the Internet: <URL:https://www.kpperformance.com/search?Category=Antennas&Rfpsan99design=Sector&Rfpsan99option=Single&view_type=grid>, 6 pages.

\* cited by examiner horizontal array of slot antenna elements

Vertical array of dipole antenna elements metal chamber (extrusion)

Example of corporate feed of the dipole array

Feed point

OMNI-DIRECTIONAL ORTHOGONALLY-POLARIZED ANTENNA SYSTEM FOR MIMO APPLICATIONS

CROSS-REFERENCE(S) TO RELATED APPLICATION(S)

This application claims the benefit and priority of U.S. Provisional Application Ser. No. 62/637,971, filed on Mar. 2, 2018, which is hereby incorporated by reference herein it its entirety including all references and appendices cited therein, for all purposes.

FIELD OF INVENTION

Embodiments of the present disclosure relate to antenna systems, and more specifically, to omni-directional orthogonally-polarized antenna systems for Multiple Inputs and Multiple Outputs (MIMO) applications.

BACKGROUND

For context, a common and classical omni-directional antenna is what is referred to as a half-wave dipole. When oriented vertically, it produces an omni-directional pattern in the azimuth plane, while the half-power beamwidth in the elevation plane is approximately 78 degrees.

For fixed wireless access (FWA) applications, an associated access point (or base station) has to transmit its signal omni-directionally in the azimuth plane, but the beamwidth can afford to be narrow in the elevation plane, thereby allowing the gain of the antenna to be increased.

Some omni-directional antennas have a narrow beamwidth in the elevation plane that is a produced by vertically stacking an array of dipole antennas, fed in a series arrangement from bottom of the array. These designs are representative of a "coaxial-collinear" array, as first described by Blumlein in 1935 (U.S. Pat. No. 2,115,761A). Many derivative designs have been described through the years, including Herber et al (U.S. Pat. No. 5,285,211A) and Ecklund et al (U.S. Pat. No. 5,600,338A). A coaxial collinear design suffers from various performance deficiencies. For example, a series arrangement of the antenna elements makes the array frequency dependent. As the proper phase of the elements occurs at a particular mid-band frequency, the array will tend to steer up or down in elevation angle as the frequency deviates from mid-band.

A coaxial, collinear array produces a vertically polarized signal, whereas modern communication systems exploit two antenna polarizations so as to double the capacity for a given amount of spectrum.

To address the narrow-band nature of series-fed antenna arrays, a number of solutions have employed a feed network which matches a time delay to each antenna element in what is typically called a "corporate feed" configuration. Kaegebein described such a system (U.S. Pat. No. 6,057,804A) for a vertical arrangement of dipoles. For sector antennas, such as those used in outdoor tower-deployed cellular applications, corporate fed arrangements of vertically disposed antenna elements is known.

To address the need for dual-polarization operation, some antennas comprise a line of dual-polarization omni-directional antennas. Some designs comprise multiple bands, including the 2.4 GHz and 5 GHz Wi-Fi bands. As with coaxial-collinear antenna designs, some omni-directional antennas employ a series-fed arrangement of antenna elements, resulting in an undesirable elevation steering over frequency.

Some radios employ multiple inputs and multiple outputs (MIMO). While only two streams of information can be carried over two antenna polarizations, additional antennas in a MIMO system allow incremental antenna gain through a technique known as "beamforming." As a generalization, each doubling of antennas within a polarization allows 3 dB greater gain than is possible with a single array. Current methods of achieving beamforming gain with omnidirectional antennas involve the use of multiple antennas, each mounted vertically, and being disposed in an arrangement occupying more space than a single antenna.

SUMMARY

According to some embodiments, the present disclosure is directed to an antenna system comprising two arrays of horizontally polarized radiating elements, and two arrays of vertically polarized radiating elements, each array having roughly 180-degree radiation pattern, disposed about a central axis in a common horizontal plane, arrays of common polarization separated by 180-degrees, such that MIMO processing of the signals to arrays of common polarization results in a radiation pattern that is substantially constant over 360-degrees in azimuth.

According to some embodiments, the present disclosure is directed to a device, comprising: a cylindrical radome housing; and an antenna system located within the cylindrical radome housing, the antenna system comprising a core assembly comprising two tubular metal extrusions, the two tubular metal extrusions enclosing slot arrays comprising a first pair of printed circuit boards each having slot elements that are horizontally polarized, the antenna system further comprising dipole arrays comprising a second pair of printed circuit boards each having dipole elements that are vertically polarized, the second pair of printed circuit boards being positioned between the two tubular metal extrusions, wherein the slot arrays and the dipole arrays cooperatively emit a radiation pattern that is substantially constant over 360-degrees in azimuth.

BRIEF DESCRIPTION OF THE DRAWINGS

Certain embodiments of the present technology are illustrated by the accompanying figures. It will be understood that the figures are not necessarily to scale and that details not necessary for an understanding of the technology or that render other details difficult to perceive may be omitted. It will be understood that the technology is not necessarily limited to the particular embodiments illustrated herein.

DETAILED DESCRIPTION

High-gain, omni-directional antennas are desirable for a wide range of applications, as higher gain helps improve radio frequency (RF) link performance and reliability. Antenna gain can be increased by reducing beamwidth in either the elevation plane, the azimuth plane, or both planes in combination. It will be understood that in general, the narrower the beamwidth, the higher the gain of the antenna. In general, the present disclosure involves omni-directional orthogonally-polarized antenna systems for MIMO applications. The present disclosure provides several advantages over current and previous technologies referenced above, which will become readily apparent throughout this disclosure.

In one or more embodiments, the present disclosure is directed to a vertically oriented antenna system providing a complete 360 degree radiation pattern in the azimuth plane. The antenna system comprises two arrays of horizontally polarized radiating elements and two arrays of vertically polarized radiating elements. In various embodiments, each array pair produces an approximately 180-degree radiation pattern. In some embodiments, some radiating elements are disposed about a central axis in a common horizontal plane. In certain embodiments, arrays of common polarization can be separated by 180-degrees such that MIMO processing of signals to arrays of common polarization results in a radiation pattern that is substantially constant over 360-degrees in an azimuth plane.

Figure 1:
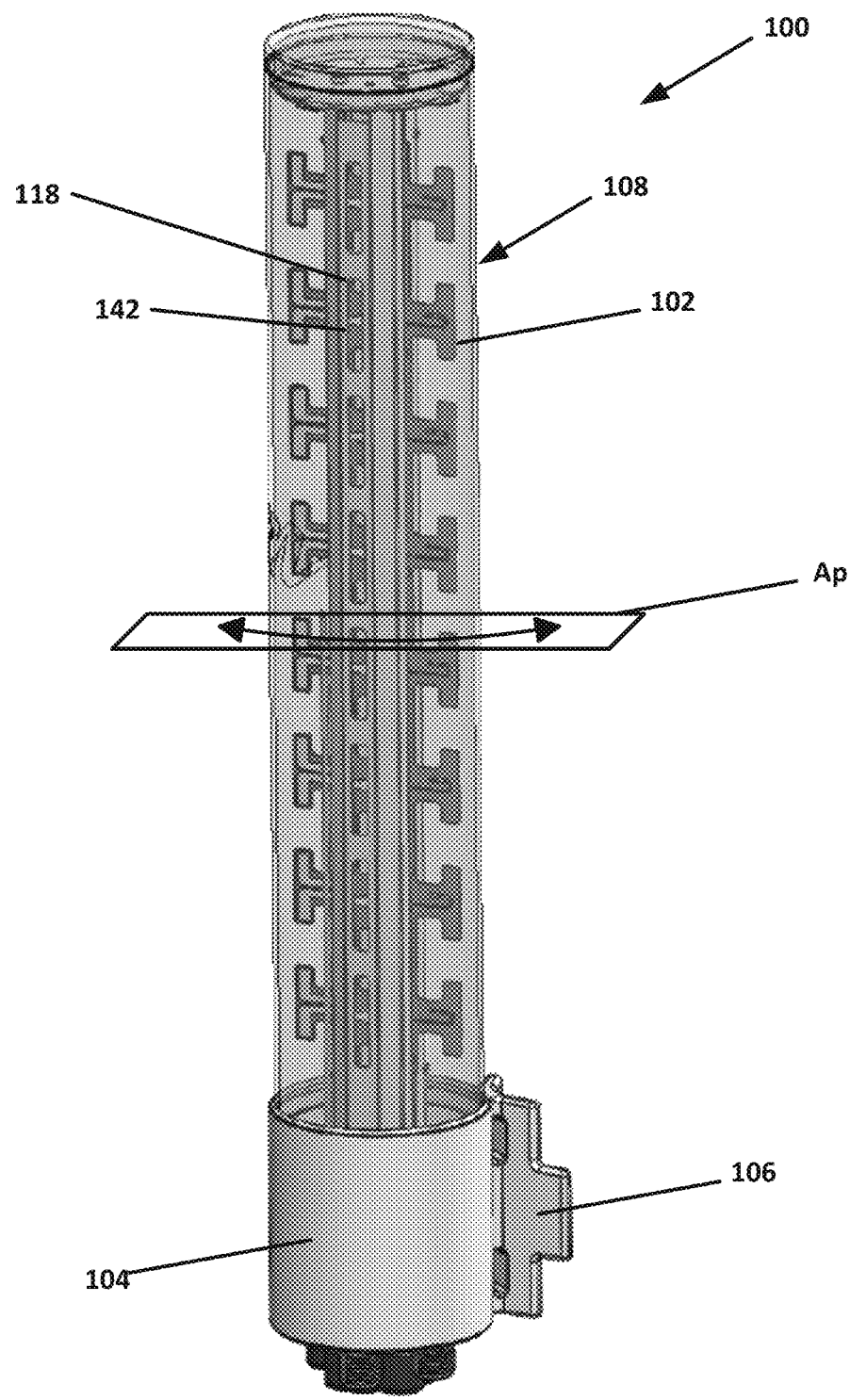
FIG. 1 is a perspective view of an example antenna system of the present disclosure.

As illustrated in FIG. 1, an example antenna system (hereinafter antenna system 100) comprises a radome housing 102 having a base 104 and a mounting plate 106. The antenna system 100 can be mounted in a vertical direction against a subordinate surface, such as a pole (no illustrated) using the mounting plate 106. This orients the antenna system 100 substantially perpendicularly or orthogonal to the ground. The radome housing 102 can be constructed from any plastic or polymeric, or other dielectric material.

Referring now to FIGS. 1 and 2A-2E collectively, in some embodiments the antenna system 100 comprises a four-port antenna (where each of four arrays are coupled to a feed) design that achieves a high-gain, omni-directional radiation pattern over a wide frequency range of operation. This antenna system 100 has dual-polarization for maximum spectral efficiency, and employs two arrays, each polarization to exploit beamforming gain. These two arrays with vertical polarization comprise a plurality of dipole antenna elements. Dipole antenna elements are connected through a corporate feed network. In various embodiments, arrays with horizontal polarization comprise slot antenna elements, which are connected through a corporate feed network.

In some embodiments, the antenna system 100 as described herein advantageously provides dual polarization (both vertical and horizontal) within a compact single package using four arrays (two vertically polarized and two horizontally polarized). Also, the antenna system 100 provides beamforming gain between two arrays of vertical polarization and two arrays of horizontal polarization. Thus, embodiments of the present technology as described herein provide uniform coverage in both vertical and horizontal polarization over 360 degrees using beamforming and polarization diversity.

In accordance with an embodiment of the present technology, the design is based on a vertical array to achieve narrow beam-width in the elevation plane, and hence high antenna gain. An omni-pattern in the azimuth is achieved by coherently combining (also known as beamforming) two 180-degree beam patterns that are pointing in opposite directions, thereby realizing beamforming gain in both transmit and receive modes of operation. A first set of two arrays is vertically polarized, each with 180 degree azimuth beamwidth. A second set of two arrays is horizontally polarized, each with 180 degree azimuth beamwidth. One example embodiment of vertical polarization employs vertically oriented dipole antennas. One example of horizontal polarization employs horizontally oriented slot antennas.

One of the advantages of the present technology is that the antenna system 100 is not frequency dependent. That is, the antenna systems described herein are as frequency independent as possible.

Figure 2A:
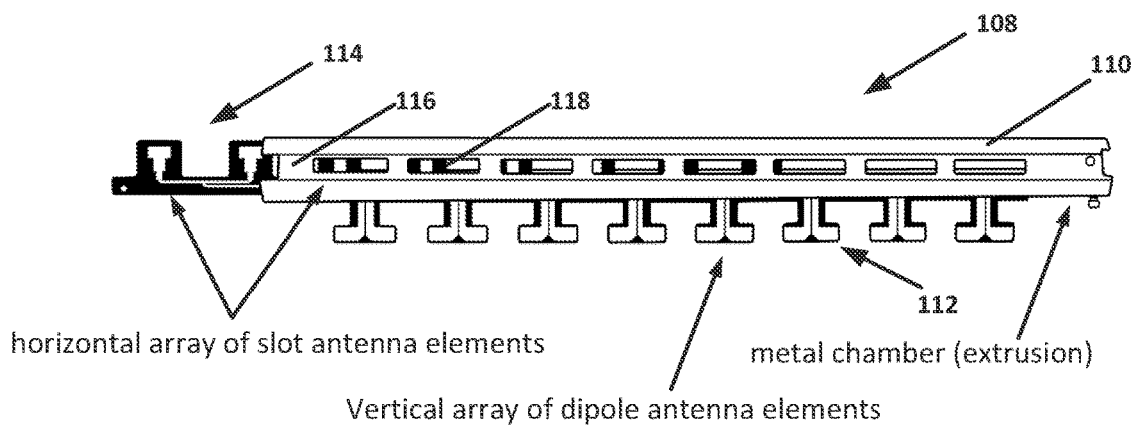
FIGS. 2A-2E collectively illustrate views of dipole element arrays and slot element arrays, as well as array assemblies comprising the same.

In an example embodiment of the present disclosure, each of the four arrays are fed using a corporate feed fabricated onto a printed circuit board to provide a wide bandwidth of operation. Turning to FIG. 2A, an example array assembly 108 comprises a metal extrusion 110, a dipole antenna element array 112, and a slot element array 114. The metal extrusion 110 is a generally tubular member having a front surface 116 with slot openings, such as slot opening 118. The dipole antenna element array 112 comprises a printed circuit board 120 having a plurality of dipole elements such as dipole element 122. Generally, the dipole element 122 comprises a body 124 and a head 126. The dipole element 122 has a T-shaped configuration in some embodiments. The body 124 and the head 126 of the dipole element 122 extend beyond an outer peripheral surface of the metal extrusion 110 when mounted to the metal extrusion 110. In some embodiments, the slot element array 114 is positioned within an interior of the metal extrusion 110 as will be discussed in greater detail with reference to FIG. 5.

Figure 2B:
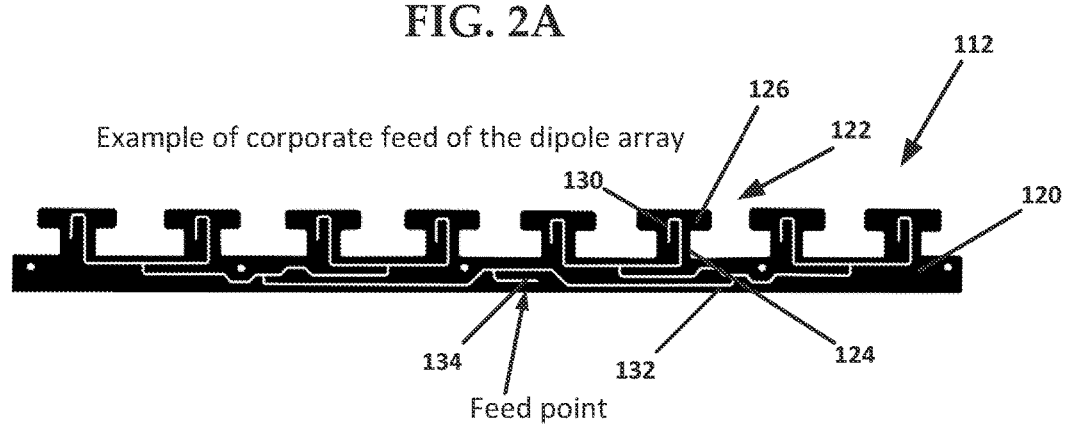

In accordance with the exemplary embodiment, arrays of the antenna system 100 are designed on a printed circuit board (PCB 120). For example, FIG. 2B illustrates the dipole antenna element array 112 formed from the PCB 120. The PCB 120 is manufactured through cutting or printing to form the dipole elements such as the dipole element 122.

FIG. 2B illustrates a rear plan view of the dipole antenna element array 112 which includes traces, such as trace 130. Each dipole element 122 is connected to a corporate feed 132 that is terminally connected to a feed point 134. Thus, each of the dipole elements is electrically coupled to the feed point 134 through the corporate feed 132. The PCB 120 can be manufactured from any suitable material that would be known to one of ordinary skill in the art.

Figure 2C:
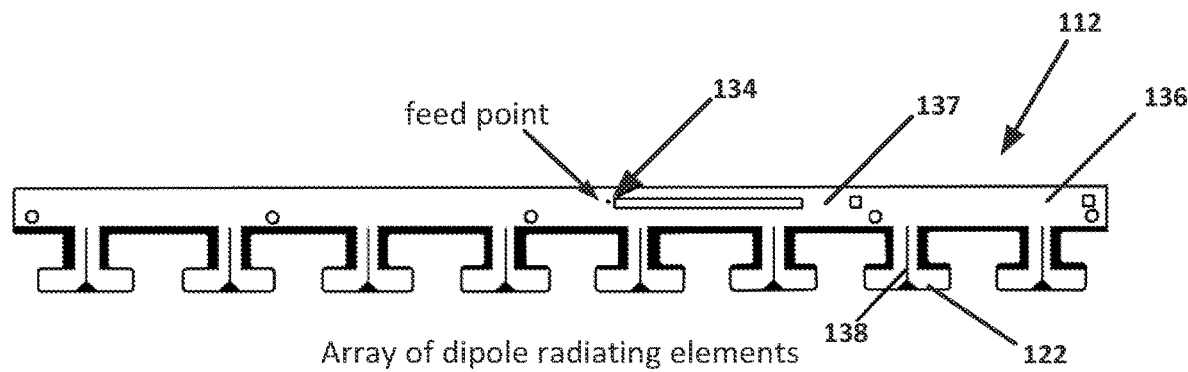

FIG. 2C illustrates a front plan view of the dipole antenna element array 112. A front surface 136 of the dipole antenna element array 112 is coated with a metallic radiating material 137 that allows the dipole elements to radiate. Each of the dipole elements such as dipole element 122 have a line of division 138 that separate two adjacent portions of metallic radiating material 137. The line of division 138 is not coated or printed with the metallic radiating material 137. To be sure, the line of division 138 separates adjacent radiating portions of each dipole element 122. The feed point 134 illustrated in FIG. 2A is also illustrated in this view.

Figure 2D:
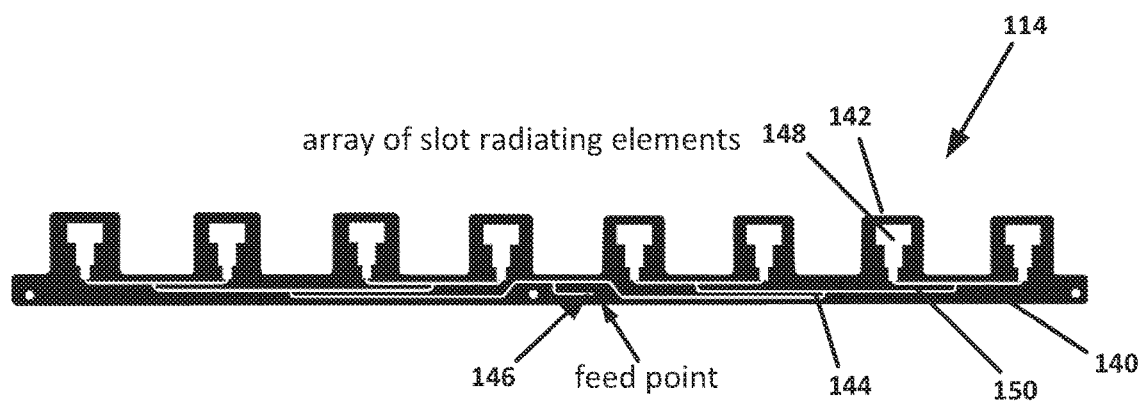

FIG. 2D is a front plan view of the slot element array 114 is a PCB 140 having a plurality of slot elements such as slot element 142. Slot elements extend as rectangular tabs that protrude from a body of the PCB 140. In one or more embodiments, the PCB 140 having slot elements forms a saw-tooth pattern.

The slot elements are electrically coupled with a corporate feed 144 that terminates at a feed point 146. The slot element 142 comprises a coating of metallic radiating material 148 that allows the slot element 142 to radiate. In some embodiments, the metallic radiating material 148 is formed to have a substantially T-shaped configuration. That is, the radiating surface of the slot element 142 has a radiating portion (e.g., metallic radiating material) that is substantially T-shaped.

In more detail, the metallic radiating material 148 is electrically coupled to a trace 150 that is in turn electrically coupled to the corporate feed 144. In various embodiments, the plurality of slot elements of the slot element array 114 align with the slot openings (such as slot element 142 aligning with slot opening 118 in FIG. 1) of the front surface 116 of the metal extrusion 110.

Figure 2E:
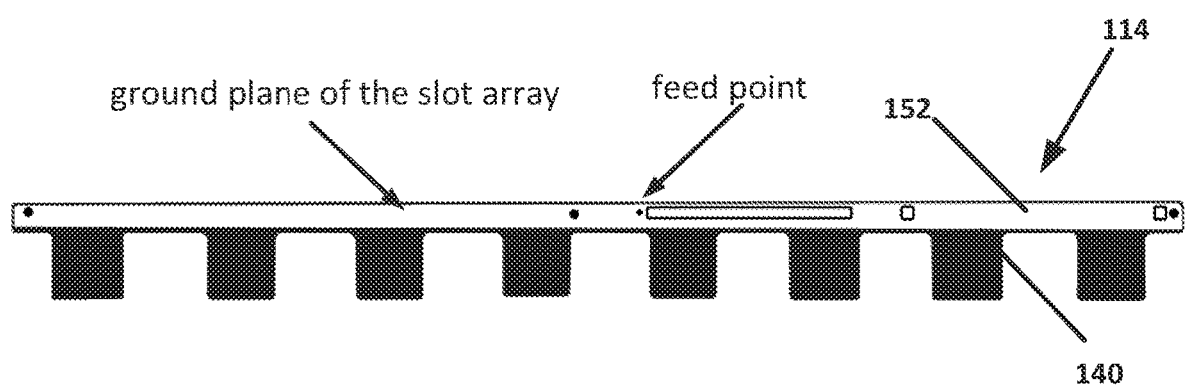

FIG. 2E is a rear plan view of a ground plane 152 of the slot element array 114. The feed point 146 is illustrated with respect to the ground plane 152. PCB 140 can be manufactured from any suitable material that would be known to one of ordinary skill in the art. In general, the metallic elements and traces provided on the PCBs 120 and 140 are created using any suitable printing process.

One exemplary embodiment of a dipole antenna array uses printed traces on a PCB, one side which routes the corporate feed, and the other side is the array of printed dipole structures with the side routing to the corporate feed. An opposing side of the dipole array has a feed point where radiation is launched by a MIMO radio and processor (see MIMO radio and processor 326 of FIG. 5). An exemplary embodiment of a slot antenna array comprises printed traces on a PCB, one side of which is the corporate feed routed to each radiating antenna element, and the other side is the ground plane, enclosed in a metal extrusion (e.g., tubular housing) with slot openings that coincide/align with the placement of the radiating antenna elements.

Figure 3:
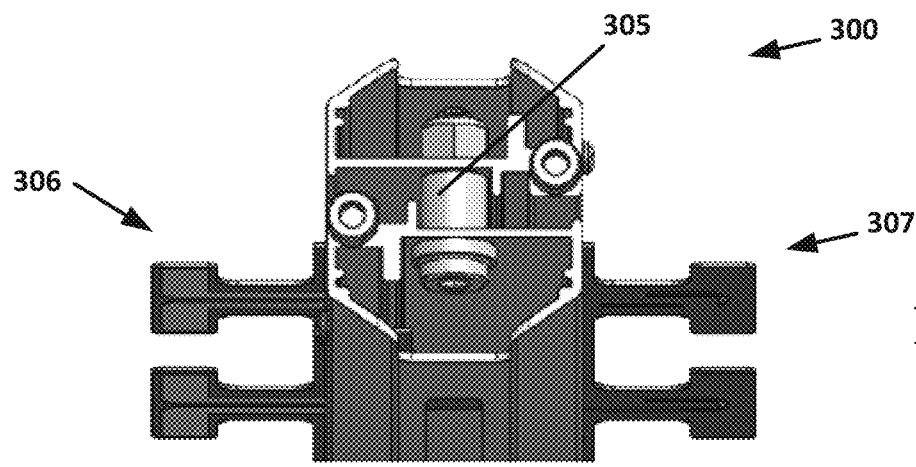
FIG. 3 is partial perspective view a core assembly of the example antenna system.
Figure 4:
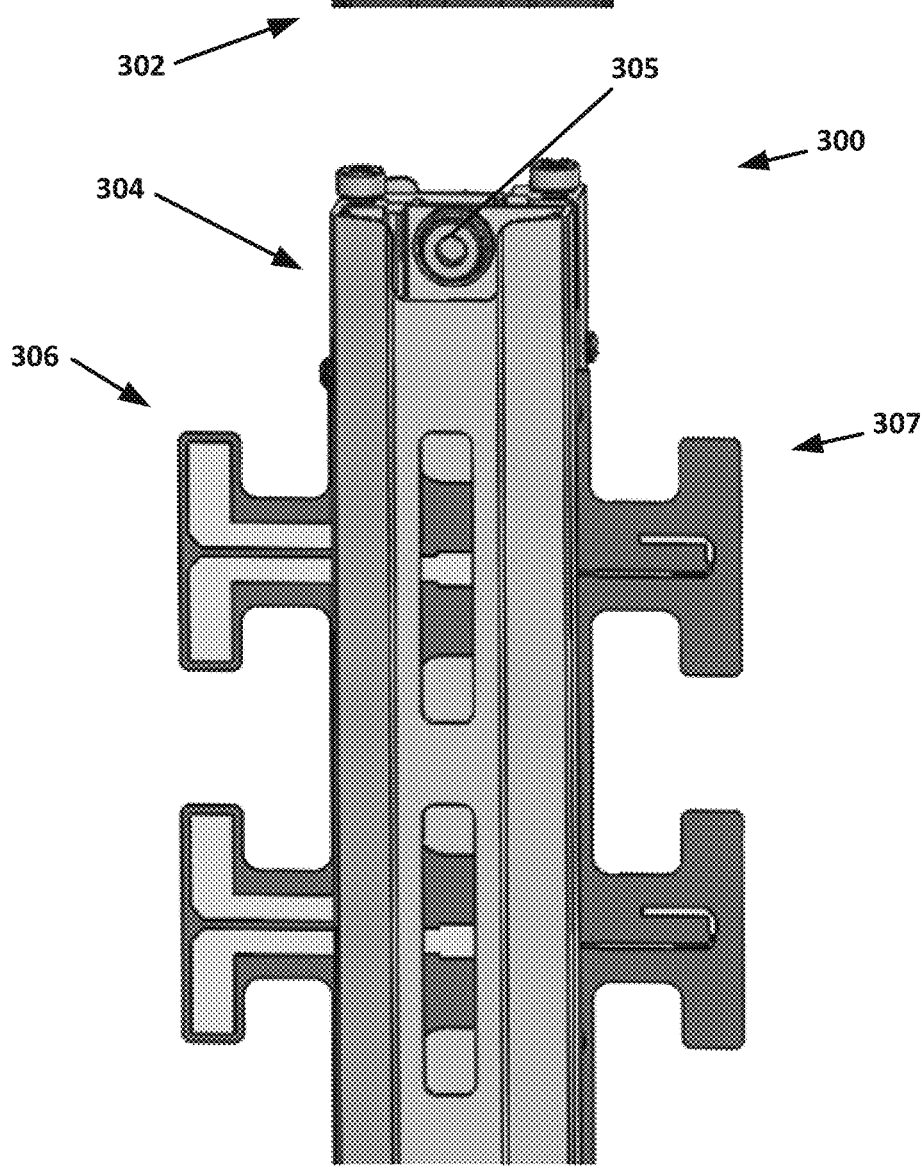
FIG. 4 is another partial perspective view a core assembly of the example antenna system.
Figure 5:
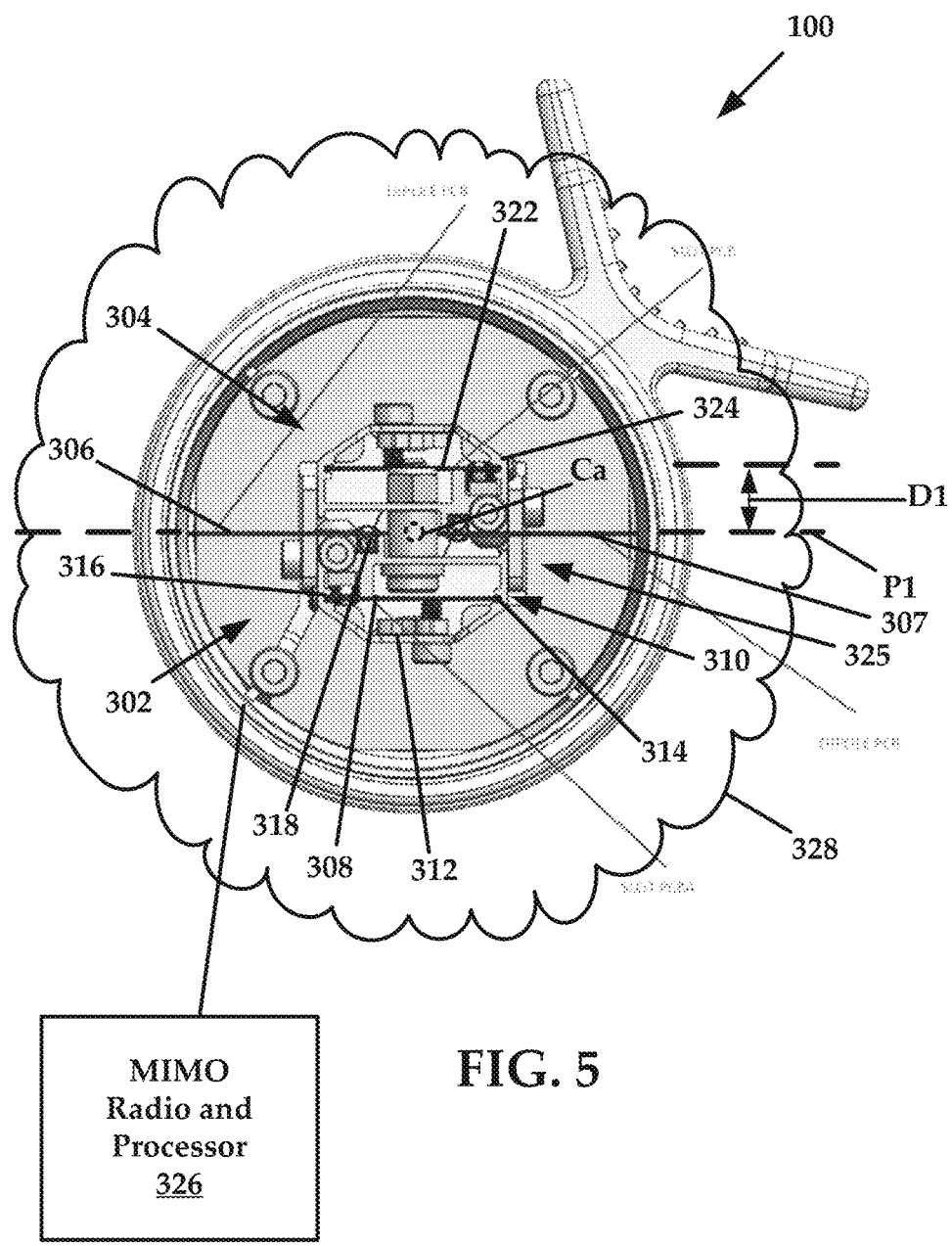
FIG. 5 is a top down view of the example antenna system illustrating a core assembly.

FIGS. 3-5 collectively illustrate a core assembly 300 having two of the array assembly 108 combined together. For purposes of clarity, a first array assembly 302 (one array assembly 108) and a second array assembly 304 (another array assembly 108) are coupled together back-to-back using fasteners, such as fastener 305.

In FIG. 4, a dipole antenna element array 306 of the first array assembly 302 is oriented such that the metallic surfaces of the dipole elements of the dipole antenna element array 306 are oriented in a first direction. Conversely, the dipole antenna element array 307 of the second array assembly 304 is oriented such that the metallic surfaces of the dipole elements of the dipole antenna element array 307 are oriented in a second direction that is opposite to the first direction. That is, the dipole antenna element array 306 and the dipole antenna element array 307 face away from one another which allows for the creation of a 180 degree beam pattern in the azimuth plane (see Ap of FIG. 1), referred to as a radiation pattern.

FIG. 5 is a top-down cross section view of the antenna system 100 that illustrates the orientation of various components. The first array assembly 302 and the second array assembly 304 are illustrated in back-to-back orientation. In the first array assembly 302, a slot element array 308 is positioned in a receiver slot 310 within the metal extrusion 312. The receiver slot 310 can include channels 314 and 316 formed into the sidewall of inner surface of the metal extrusion 312. The dipole antenna element array 306 is mounted to a rear surface 318 of the metal extrusion 312 and the dipole elements of the dipole antenna element array 306 extend outward of the metal extrusion 312.

The second array assembly 304 also comprises a slot element array 322. The second array assembly 304 is configured similarly to the first array assembly 302. Thus, the second array assembly 304 comprises a metal extrusion 324. When coupled, the metal extrusion 312 and the metal extrusion 324 form an octagonal structure.

In general, the dipole antenna element array 306 and the dipole antenna element array 307 are positioned between the metal extrusion 312 of the first array assembly 302 and the metal extrusion 324 of the second array assembly 304.

With reference to FIGS. 1-5, in operation, the antenna systems disclosed herein enable 180 degree beamwidths in an azimuth plane Ap for horizontal polarization. These 180 degree beamwidths are achieved using the first array assembly 302 and the second array assembly 304 coupled together in a center of the radome housing 102 that houses the two horizontally polarized arrays (e.g., slot element array 308 and slot element array 322).

For the vertical and horizontal polarization, the metal extrusions 312 and 324 provide isolation between a front and a back of the core assembly 300, which is how the 180 degree beamwidths are achieved. There can be a metal ground plane inside the metal chamber formed by the rear surfaces of the metal extrusion 312 and the metal extrusion 324 that acts a ground plane. 180 degree beamwidths in the azimuth plane Ap (see FIG. 1) for vertical polarization are achieved by an outer enclosure 325 formed by the metal extrusions 312 and 324.

In general, the core assembly 300 comprises two arrays of horizontally polarized radiating elements (e.g., slot element array 308 and slot element array 322). The core assembly 300 also comprises two arrays of vertically polarized radiating elements (e.g., dipole antenna element array 306 and dipole antenna element array 307) with each array having roughly 180-degree radiation pattern (see FIG. 5).

The dipole antenna element array 306 and dipole antenna element array 307 are disposed about a central axis Ca in a common horizontal plane. In some embodiments arrays of common polarization are separated by 180-degrees, such that MIMO processing of signals (such as by a MIMO processor 326) received by the arrays of common polarization results in a radiation pattern 328 that is substantially constant over 360-degrees in azimuth Ap.

In more detail, the dipole antenna element array 306 and dipole antenna element array 307 are aligned with a first plane P1. The slot element array 308 and slot element array 322 are spaced apart from and are parallel with the first plane P1. For example, slot element array 308 is spaced apart from the first plane P1 at a distance D1. Reference lines have been illustrated for the first plane P1 and a reference for the distance D1.

In sum, the antenna system comprises a core assembly comprising two tubular metal extrusions. The two tubular metal extrusions enclosing slot arrays 308/322 comprising a first pair of printed circuit boards each having slot elements that are horizontally polarized. The antenna system further comprises dipole arrays 306/307 comprising a second pair of printed circuit boards each having dipole elements that are vertically polarized. The slot arrays and the dipole arrays cooperatively emit a radiation pattern that is substantially constant over 360-degrees in azimuth.

Figure 6:
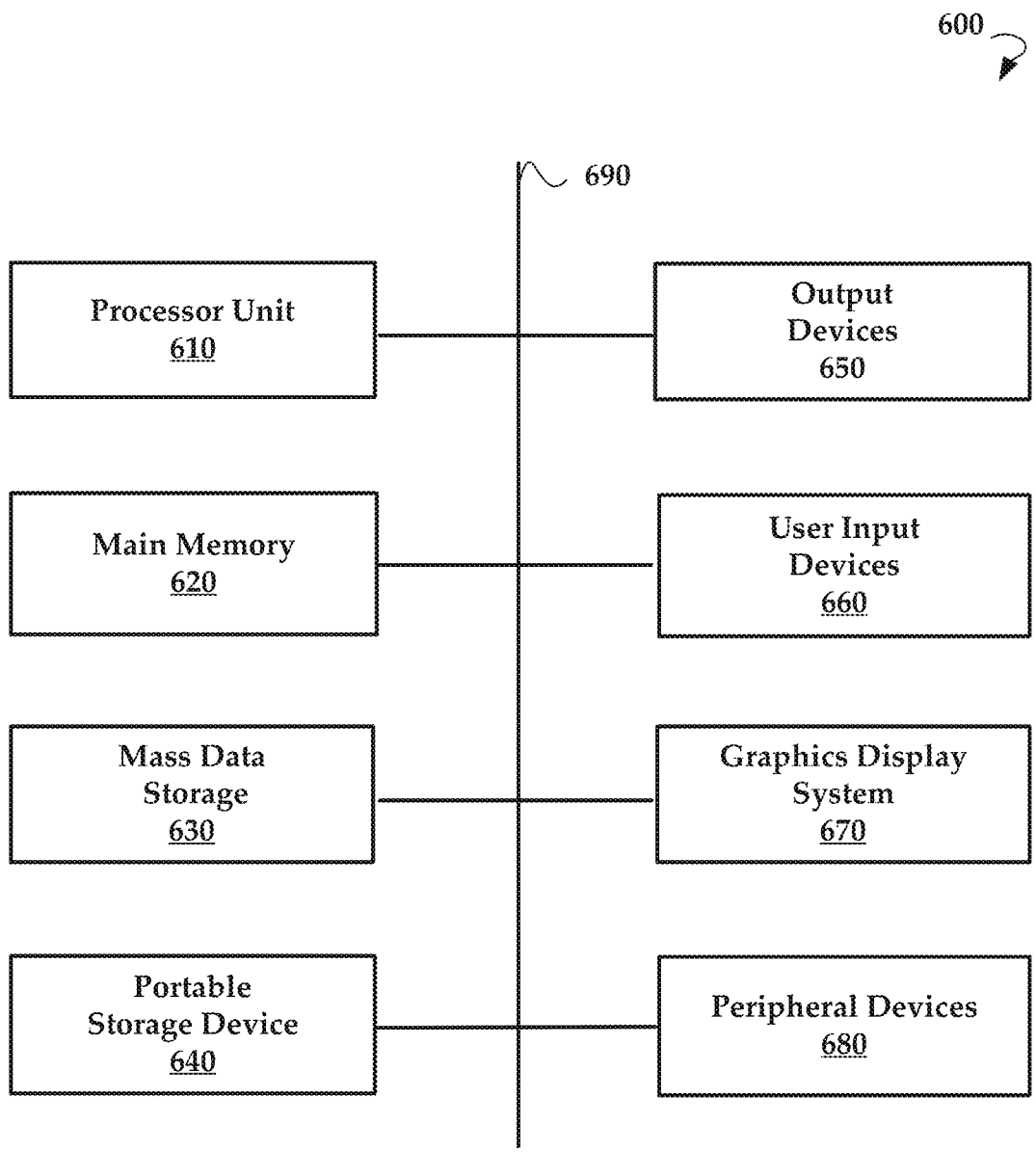
FIG. 6 illustrates an exemplary computing device that may be used to implement embodiments according to the present technology.

FIG. 6 illustrates an exemplary computer system 600 that may be used to implement some embodiments of the present invention. The computer system 600 of FIG. 6 may be implemented in the contexts of the likes of computing systems, networks, servers, or combinations thereof. The computer system 600 of FIG. 6 includes one or more processor units 610 and main memory 620. Main memory 620 stores, in part, instructions and data for execution by processor units 610. Main memory 620 stores the executable code when in operation, in this example. The computer system 600 of FIG. 6 further includes a mass data storage 630, portable storage device 640, output devices 650, user input devices 660, a graphics display system 670, and peripheral devices 680.

The components shown in FIG. 6 are depicted as being connected via a single bus 690. The components may be connected through one or more data transport means. Processor unit 610 and main memory 620 is connected via a local microprocessor bus, and the mass data storage 630, peripheral device(s) 680, portable storage device 640, and graphics display system 670 are connected via one or more input/output (I/O) buses.

Mass data storage 630, which can be implemented with a magnetic disk drive, solid state drive, or an optical disk drive, is a non-volatile storage device for storing data and instructions for use by processor unit 610. Mass data storage 630 stores the system software for implementing embodiments of the present disclosure for purposes of loading that software into main memory 620.

Portable storage device 640 operates in conjunction with a portable non-volatile storage medium, such as a flash drive, floppy disk, compact disk, digital video disc, or Universal Serial Bus (USB) storage device, to input and output data and code to and from the computer system 600 of FIG. 6. The system software for implementing embodiments of the present disclosure is stored on such a portable medium and input to the computer system 600 via the portable storage device 640.

User input devices 660 can provide a portion of a user interface. User input devices 660 may include one or more microphones, an alphanumeric keypad, such as a keyboard, for inputting alphanumeric and other information, or a pointing device, such as a mouse, a trackball, stylus, or cursor direction keys. User input devices 660 can also include a touchscreen. Additionally, the computer system 600 as shown in FIG. 6 includes output devices 650. Suitable output devices 650 include speakers, printers, network interfaces, and monitors.

Graphics display system 670 include a liquid crystal display (LCD) or other suitable display device. Graphics display system 670 is configurable to receive textual and graphical information and processes the information for output to the display device. Peripheral devices 680 may include any type of computer support device to add additional functionality to the computer system.

The components provided in the computer system 600 of FIG. 6 are those typically found in computer systems that may be suitable for use with embodiments of the present disclosure and are intended to represent a broad category of such computer components that are well known in the art. Thus, the computer system 600 of FIG. 6 can be a personal computer (PC), hand held computer system, telephone, mobile computer system, workstation, tablet, phablet, mobile phone, server, minicomputer, mainframe computer, wearable, or any other computer system. The computer may also include different bus configurations, networked platforms, multi-processor platforms, and the like. Various operating systems may be used including UNIX, LINUX, WINDOWS, MAC OS, PALM OS, QNX ANDROID, IOS, CHROME, TIZEN, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the technology. Those skilled in the art are familiar with instructions, processor(s), and storage media.

In some embodiments, the computer system 600 may be implemented as a cloud-based computing environment, such as a virtual machine operating within a computing cloud. In other embodiments, the computer system 600 may itself include a cloud-based computing environment, where the functionalities of the computer system 600 are executed in a distributed fashion. Thus, the computer system 600, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud is formed, for example, by a network of web servers that comprise a plurality of computing devices, such as the computer system 600, with each server (or at least a plurality thereof) providing processor and/or storage resources. These servers manage workloads provided by multiple users (e.g., cloud resource customers or other users). Typically, each user places workload demands upon the cloud that vary in real-time, sometimes dramatically. The nature and extent of these variations typically depends on the type of business associated with the user.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk (DVD), any other optical medium, any other physical medium with patterns of marks or holes, a RAM, a PROM, an EPROM, an EEPROM, a FLASHEPROM, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

Aspects of the present technology are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:

1. An antenna system comprising two arrays of horizontally polarized radiating elements, and two arrays of vertically polarized radiating elements, each array having roughly 180-degree radiation pattern, disposed about a central axis in a common horizontal plane, arrays of common polarization separated by 180 degrees, such that MIMO processing of signals to the arrays of common polarization results in a radiation pattern that is substantially constant over 360 degrees in azimuth.

2. The antenna system according to claim 1, wherein the horizontally polarized radiating elements comprise slot elements and the vertically polarized radiating elements comprise dipole elements.

3. The antenna system according to claim 2, further comprising a first metal extrusion and a second metal extrusion that wherein a first of the two arrays of horizontally polarized radiating elements is disposed within an enclosure of the first metal extrusion and a second of the two arrays of horizontally polarized radiating elements is disposed within an enclosure of the second metal extrusion.

4. The antenna system according to claim 3, wherein the slot elements of the first of the two arrays of horizontally polarized radiating elements and the slot elements of the second of the two arrays of horizontally polarized radiating elements are aligned with slot openings in the first metal extrusion and the second metal extrusion, respectively.

5. The antenna system according to claim 4, wherein the two arrays of vertically polarized radiating elements are positioned between the first metal extrusion and the second metal extrusion.

6. The antenna system according to claim 5, wherein the two arrays of vertically polarized radiating elements have dipole elements that partially extend beyond an outer periphery of a core assembly that is formed by both the first metal extrusion and the second metal extrusion.

7. The antenna system according to claim 1, wherein dipole elements of the two arrays of vertically polarized radiating elements are formed on a printed circuit board body, each of the dipole elements having a body and a head that are substantially T-shaped.

8. The antenna system according to claim 7, wherein a radiating surface of the dipole elements comprises a line of division that separates adjacent radiating portions.

9. The antenna system according to claim 8, wherein the dipole elements are electrically coupled to a corporate feed, the corporate feed being coupled to a feed point.

10. The antenna system according to claim 1, wherein slot elements of the two arrays of horizontally polarized radiating elements are formed on a printed circuit board body, each of the slot elements being a tab that extends from the printed circuit board body.

11. The antenna system according to claim 10, wherein a radiating surface of the slot elements have a radiating portion that is substantially T-shaped.

12. A device, comprising:
a cylindrical radome housing; and
an antenna system located within the cylindrical radome housing, the antenna system comprising a core assembly comprising two tubular metal extrusions, the two tubular metal extrusions enclosing slot arrays comprising a first pair of printed circuit boards each having slot elements that are horizontally polarized, the antenna system further comprising dipole arrays comprising a second pair of printed circuit boards each having dipole elements that are vertically polarized, the second pair of printed circuit boards being positioned between the two tubular metal extrusions, wherein the slot arrays and the dipole arrays cooperatively emit a radiation pattern that is substantially constant over 360 degrees in azimuth.

13. The device according to claim 12, wherein arrays of common polarization between the slot arrays and the dipole arrays are separated by 180 degrees.

14. The device according to claim 12, further comprising a multiple input multiple output processor electrically coupled to a corporate feed that serves each of the slot arrays and the dipole arrays.

15. The device according to claim 12, wherein the slot arrays are disposed within receiver slots of the two tubular metal extrusions.

16. The device according to claim 15, wherein the dipole arrays are aligned with one another in a first plane and the slot arrays are spaced apart from and are parallel with the first plane.

17. The device according to claim 15, wherein radiating surfaces of the dipole arrays are oppositely faced relative to one another.

18. The antenna system according to claim 17, wherein each of the radiating surfaces of the dipole elements comprise a line of division that separates adjacent radiating portions.

19. The antenna system according to claim 18, wherein radiating surfaces of each of the slot elements have a radiating portion that is substantially T-shaped.

* * * * *